No. 663,757. Patented Dec. 11, 1900.
M. E. HERTEL.
POWER TRANSMITTER.
(Application filed Feb. 11, 1899.)
(No Model.)
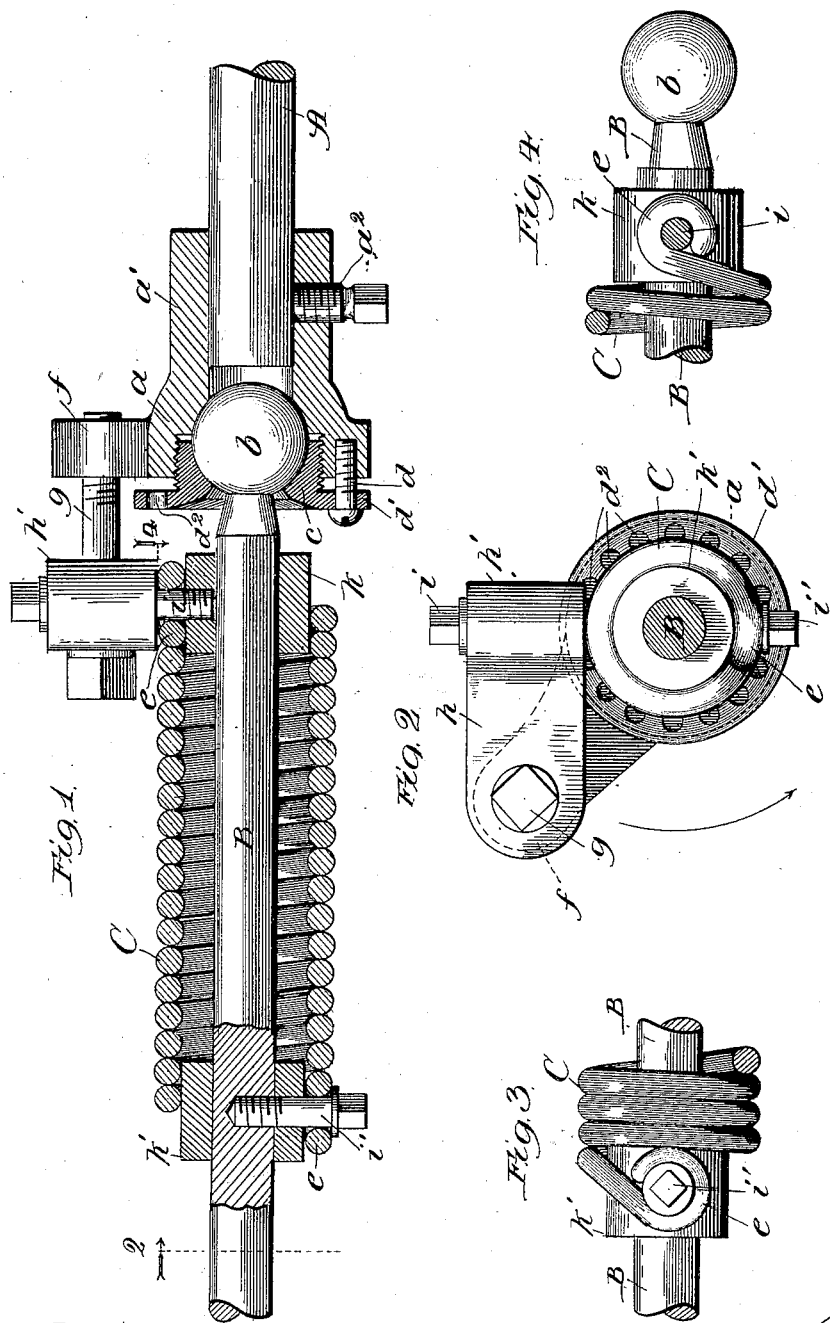
Witnesses
Chas E Gaylord
Lutie S Filter
Inventor
Max E. Hertel,
By Dyrenforth & Dyrenforth,
Attys.

UNITED STATES PATENT OFFICE.

MAX E. HERTEL, OF GREENFIELD, MASSACHUSETTS, ASSIGNOR TO THE OAKMAN MOTOR VEHICLE COMPANY, OF CHICAGO, ILLINOIS.

POWER-TRANSMITTER.

SPECIFICATION forming part of Letters Patent No. 663,757, dated December 11, 1900.

Application filed February 11, 1899. Serial No. 705,243. (No model.)

*To all whom it may concern:*

Be it known that I, MAX E. HERTEL, a citizen of the United States, residing at Greenfield, in the county of Franklin and State of Massachusetts, have invented a new and useful Improvement in Power-Transmitters, of which the following is a specification.

My invention relates to improved means for transmitting power from one rotary shaft to another; and my objects are to avoid the transmission of changes in speed with undue suddenness from one shaft to the other and afford lateral movement to the driven shaft and also rotary motion thereto independent of the drive-shaft.

I have more especially devised my improvement for use with motocycles, and particularly with the motocycle forming the subject of Letters Patent of the United States No. 583,749, granted to me June 1, 1897; but I do not limit my invention to such particular connection, as it may be used for various other power-transmitting purposes.

In the accompanying drawings, Figure 1 is a view showing my improved power-transmitter in partially longitudinal section; Fig. 2, a section taken at the line 2 on Fig. 1 and viewed in the direction of the arrow; Fig. 3, a view regarded from underneath of an end portion of the spring, showing the mode of fastening it to the driven shaft; and Fig. 4 a top view of the opposite end of the spring, showing the mode of fastening it to a collar loosely surrounding the driven shaft.

A is the rotary drive-shaft, carrying at one end the socket $a$, having a sleeve $a'$ surrounding the shaft and fastened thereto by a screw $a^2$.

B is the driven shaft, terminating at one end in a ball $b$, confined in the socket $a$, to afford a ball-and-socket or universal joint by a cone $c$, screwed into the socket and fastened through one of a circumferential series of openings $d^2$ in its flange $d'$ by a screw $d$. The ball-and-socket connection permits lateral movement to the end of the shaft B opposite that carrying the ball and also permits it to rotate independently of the shaft A to an extent limited by the spring connection between the two, hereinafter described. From the socket $a$ there projects upward a bearing $f$, into which is screwed one end of a pin $g$, carrying pivotally a link $h$, terminating in a sleeve $h'$. The link $h$ is composed of flexible material, preferably leather, which is the material I use.

C is a spring coiled about the shaft B and terminating at its opposite ends in eyes like the eye $e$, (shown in Figs. 3 and 4,) through one of which it is fastened by a pin $i$, screwed into a collar $k$, loosely surrounding the shaft, the opposite end of the spring being fastened through its eyes to the shaft by a pin $i'$, screwed into the shaft through a collar $k'$, surrounding it.

The sleeve $h'$ of the link $h$ surrounds the pin $i$, thereby flexibly connecting the shaft A with the collar $k$, which is yieldingly connected with the shaft B by the spring C.

From the foregoing description of the construction it will be seen that when in the rotation of the shaft A it has tensioned the spring C (which is preferably, but not necessarily, a coiled spring) sufficiently to cause it to overcome the resistance of the shaft B it will transmit the power of the drive-shaft to and drive the shaft B; that the spring takes up the shock that would otherwise be transmitted to the shaft B from the shaft A by a sudden change in speed in the shaft A, and that the transmission of sudden changes in speed from the shaft A to the shaft B is avoided.

What I claim as new, and desire to secure by Letters Patent, is—

1. In a power-transmitter, the combination of a drive-shaft and a driven shaft having a universal-joint connection, and a spring firmly fastened to the driven shaft and yieldingly connected with the drive-shaft, substantially as described.

2. In a power-transmitter, the combination of a drive-shaft and a driven shaft having a universal-joint connection, a spring fastened rigidly at one end to the driven shaft, a collar loosely carried by the driven shaft and to which the opposite end of said spring is fastened, and a flexible link connection between said collar and drive-shaft, substantially as described.

3. In a power-transmitter, the combination of a drive-shaft and a driven shaft having an end-to-end ball-and-socket-joint connection, a spring coiled about the driven shaft, a collar on the driven shaft through which one end of the spring is fastened firmly thereto, a collar having the opposite end of the spring fastened to it and loosely surrounding the driven shaft, and a flexible link connection between said loose collar and the socket portion of said joint, substantially as described.

4. In a power-transmitter, the combination of a drive-shaft and a driven shaft having an end-to-end ball-and-socket-joint connection, a spring coiled about the driven shaft, a collar on the driven shaft through which one end of the spring is firmly fastened thereto, a collar loosely surrounding said driven shaft, a pin connecting the opposite end of the spring with said loose collar, a flexible link connected with said pin, and a pin connecting said link with the socket portion of said joint, substantially as described.

5. A power-transmitter comprising, in combination, the shaft A having fastened to one end a socket $a$ provided with a bearing $f$, a shaft B terminating at one end in a ball $b$ confined within said socket by a cone $c$, collars $k$ and $k'$, a spring C surrounding the shaft B, said spring terminating in eyes $e$, through one of which it is fastened to the shaft through the collar $k'$, a pin $i$ connecting the spring through an eye $e$ to said collar $k$, a link $h$ connected with the pin $i$, and a pin $g$ connecting said link with the bearing $f$, the whole being constructed and arranged to operate substantially as described.

MAX E. HERTEL.

In presence of—
R. N. OAKMAN,
GEORGE C. LUNT.